H. C. MILLIGAN.
SHEET-METAL SPOONS.

No. 194,709.   Patented Aug. 28, 1877.

Witnesses:  Inventor.

UNITED STATES PATENT OFFICE.

HENRY C. MILLIGAN, OF ELIZABETH, NEW JERSEY.

IMPROVEMENT IN SHEET-METAL SPOONS.

Specification forming part of Letters Patent No. 194,709, dated August 28, 1877; application filed August 10, 1877.

*To all whom it may concern:*

Be it known that I, H. C. MILLIGAN, of Elizabeth, in the county of Union and State of New Jersey, have invented certain new and useful Improvements in Sheet-Metal Spoons; and I do hereby declare that the following is a full, clear, and exact description thereof, reference being had to the accompanying drawings, making a part of this specification.

My invention relates to certain new and useful improvements in the manufacture of sheet-metal spoons and other analogous articles.

It has for its object great strength of the handle longitudinally and at its point of juncture with the bowl, while preserving the most desirable design of the handle and bowl; and with these objects in view my invention consists of a spoon or other analogous article having its handle strengthened longitudinally, and at its point of juncture with the bowl, by a flange turned down from the edge of the handle, and extending along the butt of the bowl and slightly below the horizontal plane of the top edge thereof, as will be hereinafter more fully set forth.

Previous to my invention several methods of accomplishing the object sought by me have been suggested, the most approved of which have consisted in turning down the edges of the handle up to the point of juncture with the bowl, and in forming a central longitudinal rib in the handle and extending it within the butt of the bowl. The first of these I have found, while it strengthens the handle, leaves the line or point of juncture between the handle and bowl very weak; and the second method, while accomplishing the ends sought, disfigures the natural design of the bowl, and results in a considerably large percentage of waste and destruction in manufacture.

My invention, while it accomplishes all the advantages of the latter, at the same time preserves the design of the bowl and lessens the percentage of destruction in manufacture.

In order that those skilled in the art may more fully understand the nature of my invention, and the manner in which I practice the same in the manufacture of spoons, &c., I will proceed to describe the same more in detail, referring by letters to the accompanying drawing, in which—

Figure 1:
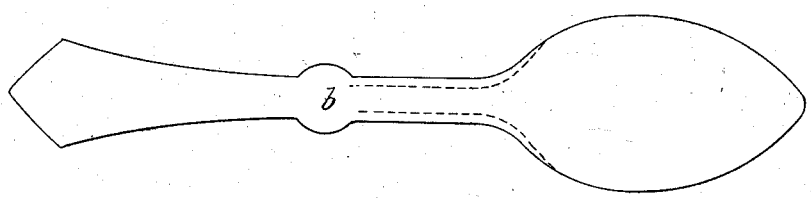
Figure 2:
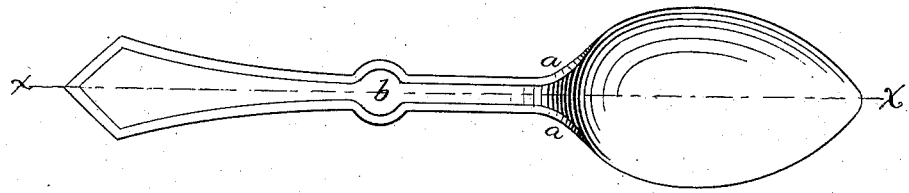
Figure 3:
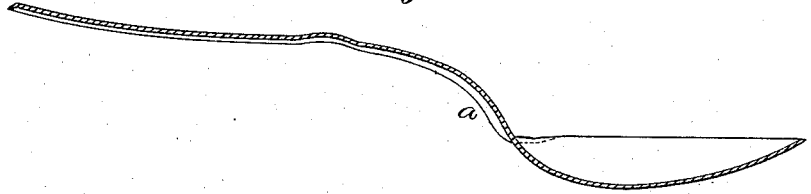

Figure 1 is a top or plan view of the ordinary sheet-metal spoon-blank with the bowl formed. Fig. 2 is a similar view of a finished spoon embodying my invention; and Fig. 3 is a central longitudinal section taken at the line *x x* of Fig. 2.

In carrying out my invention the spoon first assumes the form seen at Fig. 1 of a partially-formed blank. It is then subjected to pressure to produce any embossed or intaglio design, and, finally, the edges are turned over at about the line indicated by dotted lines in Fig. 1, to form a flange, as clearly seen at *a*, Figs. 2 and 3. The flange *a* extends to the central medallion *b*, or it may continue around the entire handle. It must extend around the edge of the bowl at and beyond the point of juncture with the handle, and curved below the horizontal plane of the top edge of the bowl, so that the flange is not only turned over from the edge, but its longitudinal direction is such that at or near the point of juncture between the handle and bowl it travels below the plane of the top edge thereof, as clearly shown in the drawing.

The operations necessary to complete the spoon may be performed at different times and independently of each other, though I prefer to make the operations continuous or as simultaneous as possible.

It will be observed that while a perfect strengthening-flange, *a*, is formed at the rear of the bowl, and on the handle, the longitudinal section of the bowl remains the same as before the formation of the flange, or in other words the scoop design and carrying capacity of the bowl are not disturbed.

I do not wish to limit myself to the exact point shown for the termination of the flange in the bowl, as it may be varied in this respect considerably without departing from the spirit of my invention, so long as the terminus of the flange extends beyond and below that point where the horizontal plane of the bowl edge intersects the handle of the spoon to form a rigid point of juncture, as described; nor do I wish to be confined in my invention to its application to spoons, as it may with equal advantages be employed in all analogous articles made of sheet metal.

What I claim as new, and desire to secure by Letters Patent, is—

A spoon or other analogous article, having its handle and the point of juncture with the bowl stiffened by a flange turned down upon the edges of the handle and extending upon the bowl and below the horizontal plane of its top edge, substantially in the manner described.

In testimony whereof I have hereunto set my hand this 8th day of August, 1877.

HENRY C. MILLIGAN.

Witnesses:
C. F. KILBURN,
R. J. D. DUNN.